US006649698B1

(12) United States Patent
Mehta

(10) Patent No.: US 6,649,698 B1
(45) Date of Patent: Nov. 18, 2003

(54) POLYETHYLENE BLENDS

(75) Inventor: Sameer D. Mehta, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 12 days.

(21) Appl. No.: 10/147,843

(22) Filed: May 17, 2002

(51) Int. Cl.[7] .......................... C08L 23/00; C08L 23/04
(52) U.S. Cl. ........................................ 525/191; 525/240
(58) Field of Search ................................. 525/191, 240

(56) References Cited

U.S. PATENT DOCUMENTS

| | | | |
|---|---|---|---|
| 4,086,204 A | 4/1978 | Cassandrini et al. | 260/45.8 |
| 4,331,586 A | 5/1982 | Hardy | 525/186 |
| 4,374,227 A | 2/1983 | Michie, Jr. | 524/528 |
| 4,542,199 A | 9/1985 | Kaminsky et al. | 526/160 |
| 4,812,500 A | 3/1989 | Hayden | 524/99 |
| 5,338,589 A | 8/1994 | Böhm et al. | 428/36.9 |
| 5,539,124 A | 7/1996 | Etherton et al. | 548/402 |
| 5,637,660 A | 6/1997 | Nagy et al. | 526/160 |
| 5,747,134 A | 5/1998 | Mohammed et al. | 427/57 |
| 5,756,611 A | 5/1998 | Etherton et al. | 526/127 |
| 6,034,027 A | 3/2000 | Krishnamurti et al. | 502/200 |

Primary Examiner—Nathan M. Nutter
(74) Attorney, Agent, or Firm—Kevin M. Carroll

(57) ABSTRACT

A blend comprising a high molecular weight, high density polyethylene (HMW HDPE) and a linear low density polyethylene (LLDPE) is disclosed. The blend comprises from about 50 wt. % to about 80 wt. % of HMW HDPE. The HMW HDPE has a density greater than about 0.94 g/cc and a melt index $MI_2$ less than about 0.1 dg/min. The blend also comprises about 20 wt. % to about 50. wt % of LLDPE. The LLDPE has a density within the range of about 0.90 to about 0.93 g/cc and an $MI_2$ within the range of about 0.5 to about 5 dg/min. The LLDPE is a copolymer of ethylene with 1-hexene that has a dart drop impact strength of greater than about 500 grams as measured by ASTM D1709/A. The blend shows increased resistance to environmental stress cracking.

20 Claims, No Drawings

POLYETHYLENE BLENDS

FIELD OF THE INVENTION

The invention relates to polyethylene blends. The blends comprise a high molecular weight, high density polyethylene (HMW HDPE) and a linear low density polyethylene (LLDPE) that is a copolymer of ethylene with hexene. The invention also relates to geomembranes and medium density pipes made from the blends.

BACKGROUND OF THE INVENTION

Polyethylene is divided into high density (HDPE, density 0.941 g/cc or greater), medium density (MDPE, density from 0.926 to 0.940 g/cc), low density (LDPE, density from 0.910 to 0.925 g/cc) and linear low density polyethylene (LLDPE, density from 0.910 to 0.925 g/cc). (See ASTM D4976-98: Standard Specification for Polyethylene Plastic Molding and Extrusion Materials.) Polyethylene is useful in many commercial applications, however each application requires unique properties designed for the particular needs of the application.

For applications such as medium density pipes and geomembranes, it is important that the polyethylene meet high Environmental Stress Cracking Resistance (ESCR). Stress cracking according to ASTM D883 is "an external or internal crack in a plastic caused by tensile stresses less than its short-term mechanical strength." Environmental stress cracking typically occurs in the presence of surface wetting agents such as alcohols, soaps, surfactants, and others. Thus, high resistance to environmental stress cracking is a particularly important performance criteria for polyethylene to be used in medium density pipe and geomembrane applications. ESCR is measured by a variety of different analytical methods, including the bent strip ESCR test (ASTM D1693) and the notched constant tensile load (NCTL) test (ASTM D5397). Typically, geomembranes, for instance, require a minimum notched constant tensile load, as measured by ASTM D5397, of greater than 200 hours. However, industry requirements continue to push the NCTL minimum to higher numbers, thus requiring improvements in the polyethylene and polyethylene blends used in these applications.

U.S. Pat. No. 5,338,589 discloses a polyethylene molding composition consisting of 50 to 80% of a high density polyethylene having a broad bimodal molecular weight distribution and 20 to 50% of a linear low density polyethylene. The disclosed composition is described as possessing good resistance to environmental stress cracking and is useful in MDPE pipes. As with any polymer composition, it is advantageous to improve properties including ESCR for use in applications such as MDPE pipes and geomembranes.

In sum, improved polyethylene blends with higher resistance to environmental stress cracking are needed. These polyethylene blends would be extremely useful in applications such as geomembranes and MDPE pipes.

SUMMARY OF THE INVENTION

The invention is a blend comprising a high molecular weight, high density polyethylene (HMW HDPE) and a linear low density polyethylene (LLDPE). The blend comprises from about 50 wt. % to about 80 wt. % of HMW HDPE having a density from about 0.94 g/cc or greater and a melt index $MI_2$ of less than about 0.1 dg/min. The blend also comprises about 20 wt. % to about 50 wt. % of LLDPE, where the LLDPE is a copolymer of ethylene with hexene. The LLDPE has a density within the range of about 0.90 to about 0.93 g/cc and an $MI_2$ within the range of about 0.50 to about 5 dg/min. The LLDPE is a high performance LLDPE that has a dart drop impact strength of greater than about 500 grams as measured by ASTM D1709/A. I have surprisingly found that blending the HMW HDPE and the LLDPE gives enhanced environmental stress cracking resistance compared to blends using standard LLDPEs.

DETAILED DESCRIPTION OF THE INVENTION

The blend of the invention comprises from about 50 wt. % to about 80 wt. % of a high molecular weight, high density polyethylene (HMW HDPE). Preferably, the blend comprises from about 60 wt. % to about 75 wt. % of HMW HDPE: The HMW HDPE has a density within the range of about 0.94 g/cc or greater, preferably greater than about 0.946 g/cc. The HMW HDPE may contain small portions of $C_3$ to $C_{10}$ α-olefins including propylene, 1-butene, 1-pentene, 1-hexene, 4-methyl-1-pentene, and 1-octene, and the like, and mixtures thereof.

The HMW HDPE has an $MI_2$ less than about 0.1 dg/min, preferably less than about 0.08 dg/min. Melt index ($MI_2$) is usually used to measure polymer molecular weight, with a lower $MI_2$ indicating a higher molecular weight. The $MI_2$ can be measured according to ASTM D-1238 where the $MI_2$ is measured at 190° C. under 2.16 kg load. The HMW HDPE has a considerably higher molecular weight (or lower $MI_2$) and typically will have a broader molecular weight distribution (or larger MFR) than conventional HDPE.

Preferably, the HMW HDPE has a bimodal molecular weight distribution. A bimodal molecular weight distribution HDPE will typically have two different molecular weight components, and usually the two components differ chemically and structurally from each other.

The blend of the invention also comprises from about 20 wt. % to about 50 wt. % of a linear low density polyethylene (LLDPE). Preferably, the blend comprises from about 25 wt. % to about 40 wt. % of LLDPE. The LLDPE useful in the invention is a copolymer of ethylene with hexene. The LLDPE has a density within the range of about 0.90 to about 0.93 g/cc, preferably within the range of about 0.91 to about 0.925 g1cc. The LLDPE also has an $MI_2$ within the range of about 0.5 to about 5 dg/min. The LLDPE can be produced by Ziegler catalysts or newly developed single-site catalysts. Ziegler catalysts are well known. Examples of suitable Ziegler catalysts for making LLDPE include titanium halides, titanium alkoxides, vanadium halides, and mixtures thereof. Ziegler catalysts are used with cocatalysts such as alkyl aluminum compounds.

Single-site catalysts can be divided into metallocene and non-metallocene. Metallocene single-site catalysts are transition metal compounds that contain cyclopentadienyl (Cp) or Cp derivative ligands. For example, U.S. Pat. No. 4,542,199, the teachings of which are incorporated herein by reference, teaches metallocene catalysts. Non-metallocene single-site catalysts contain ligands other than Cp but have the same catalytic characteristics as metallocenes. The non-metallocene single-site catalysts may contain heteroatomic ligands, e.g., boraaryl, pyrrolyl, azaborolinyl or quinolinyl. For example, U.S. Pat. Nos. 6,034,027, 5,539,124, 5,756,611 and 5,637,660, the teachings of which are incorporated herein by reference, teach non-metallocene catalysts.

The LLDPE useful in the invention is a copolymer of ethylene and 1-hexene, and is a high performance LLDPE that exhibits unique melt elastic properties and has a network structure. The LLDPE of the invention has a dart drop impact strength of greater than about 500 grams as measured by ASTM D1709/A, preferably greater than about 600 grams. These high performance 1-hexene based LLDPEs have been described in U.S. Pat. No. 6,171,993, the teachings of which are herein incorporated by reference. Commercial examples of these high performance 1-hexene based LLDPEs include Petrothene® Select GA TR311 from Equistar Chemicals.

Optionally, the blend also contains antioxidants, UV-absorbents, flow agents, or other additives. The additives are well known in the art. For example, U.S. Pat. Nos. 4,086,204, 4,331,586 and 4,812,500, the teachings of which are herein incorporated by reference, teach UV stabilizers for polyolefins. Additives are added in an amount preferably less than 10 wt. % of the total blend.

Any suitable blending technique can be used. The polymers and optional additives can be blended in solution or in thermal processing. Melt screw extrusion is preferred. The resulting blend preferably has a density within the range of about 0.93 to about 0.945 g/cc and an $MI_2$ within the range of about 0.06 to about 0.4 dg/min. The blends of the invention exhibit high notched constant tensile load (NCTL) greater than about 500 hours, preferably greater than about 1000 hours, and most preferably greater than about 1500 hours. Notched constant tensile load is a measure of Environmental Stress Cracking Resistance measured by ASTM D5397. The load used for the NCTL test is 30% of the room temperature yield stress of the material. The yield stress of the material is measured according to ASTM D638.

The invention includes medium density pipes made from the blends. Processes to make medium density pipes from polyethylene blends are well known in the art. See, for example, U.S. Pat. No. 4,374,227. Typically, the HMW HDPE and LLDPE will be Banburied, milled, granulated, and pelletized with carbon black and antioxidant additives. This composition is then fed through a pipe extruder to form a medium density pipe.

The invention also includes geomembranes made from the blends. Geomembranes are polymer sheets used as part of environmental barriers that provide an impermeable, strong covering involved in outdoor uses such as ponds, land fills, and waste disposal. The geomembranes are usually formulated as sheets in the thickness range of 0.25 mm to 3.0 mm. The polyethylene blends useful in geomembrane applications typically will contain additives to enhance the properties of the polymer sheet. For instance, suitable additives include fire and flame retardants, colorants and pigments (such as carbon black), ultraviolet absorbers and stabilizers, biocides, fillers, extenders, antioxidants, vulcanizer and impact modifiers. Geomembranes are described in U.S. Pat. No. 5,747,134.

The following examples merely illustrate the invention. Those skilled in the art will recognize many variations that are within the spirit of the invention and scope of the claims.

EXAMPLE 1

Blends of HMW HDPE and LLDPE in 65/35 by Weight

The blends prepared in Example 1 are produced from a commercial high molecular weight, high density polyethylene blended with a commercial LLDPE. The HMW HDPE is a 0.075 MI, 0.949 density powder produced by Equistar Chemical Company. The example of the invention blends the HMW HDPE with Petrothene® Select GA TR311 LLDPE (from Equistar Chemical Company). The comparative blends use Petrothene® GA 501 LLDPE (an ethylene-butene copolymer from Equistar Chemical Company) and Petrothene® GA 601 LLDPE (an ethylene-hexene copolymer from Equistar Chemical Company). The properties of the commercial LLDPEs used in the example blends are shown in Table 1. The dart drop impact strength is measured on a blown film made from the LLDPE resins. The blown film is made at 1 mil thickness, 2.5:1 Blow-Up-Ratio, 100 mil die gap, 150 lb/hr, 8" die, dual lip air ring, ~16" Frost-Line-Height.

The HMW HDPE powder is stabilized by dry blending with the following additive package: 850 ppm Irganox 1010 (product of Ciba Specialty Chemicals, as primary antioxidant), 600 ppm Irgafos 168 (product of Ciba Specialty Chemicals, as secondary antioxidant), 1000 ppm Calcium Stearate (as an acid scavenger), 750 ppm Zinc Stearate (as an acid scavenger). After dry blending in the additive package, the stabilized HMW HDPE is pelletized on a Killion single screw extruder. These HDPE pellets are then dry blended with LLDPE pellets and the final blends are made by pelletizing these dry blends on the Killion single screw extruder.

The temperature profile on the Killion for all the formulations is set at 390 F (Zone 1), 450 F (Zones 2 and 3), Die (450F). Extruder speed is kept at 60 rpm for all the formulations.

Comparative blend 1A combines the HMW HDPE with Petrothene® GA 501 LLDPE. Comparative-blend 1B combines the HMW HDPE with Petrothene® GA 601 LLDPE. Blend 1C of the invention combines the HMW HDPE with Petrothene® Select GA TR311 LLDPE. The properties of the blends are shown in Table 2.

EXAMPLE 2

Blends of HMW HDPE and LLDPE in 70/30 by Weight

Example 1 is repeated, but the ratio of HMW HDPE/LLDPE is 70/30 by weight. Comparative blend 2A combines the HMW HDPE with Petrothene® GA 501 LLDPE. Comparative blend 2B combines the HMW HDPE with Petrothene® GA 601 LLDPE. Blend 2C of the invention combines the HMW HDPE with Petrothene® Select GA TR311 LLDPE. The properties of the blends are shown in Table 2.

EXAMPLE 3

Blend of HMW HDPE and LLDPE in 80/20 by Weight

Example 1 is repeated, but the ratio of HMW HDPE/LLDPE is 80/20 by weight. Comparative blend 3A combines the HMW HDPE with Petrothene® GA 501 LLDPE. Comparative blend 3B combines the HMW HDPE with Petrothene® GA 601 LLDPE. Blend 3C of the invention combines the HMW HDPE with Petrothene® Select GA TR311 LLDPE. The properties of the blends are shown in Table 2.

The examples demonstrate that blending HMW HDPE with a LLDPE having. dart drop impact greater than 500 g (as measured. by ASTM D1709/A) surprisingly results in greatly improved resistance to environmental stress cracking as measured by the notched constant tensile load (NCTL) test (ASTM D5397).

TABLE 1

Summary of Physical Properties of LLDPE

| LLDPE | Density (g/cc)[1] | MI (dg/min)[2] | Dart Drop Impact Strength (g)[3] |
|---|---|---|---|
| Petrothene ® GA 501 | 0.918 | 1.0 | 100 |
| Petrothene ® GA 601 | 0.918 | 1.0 | 190 |
| Petrothene ® Select GA TR311 | 0.915 | 0.7 | 750 |

[1]as measured by ASTM D1505.
[2]as measured by ASTM D1238.
[3]as measured by ASTM D1709/A (1 mil film, 2.5:1 BUR, 100 mil die gap, 150 lb/hr, 8" die, dual lip air ring. 16" frost-line-height).

TABLE 2

Summary of Physical Properties of the Blends

| Blend # | HMW HDPE/LLDPE ratio | Density (g/cc)[1] | MI (dg/min)[2] | NCTL (h)[3] |
|---|---|---|---|---|
| 1A* | 65/35 | 0.9382 | 0.185 | 226 |
| 1B* | 65/35 | 0.938 | 0.2 | 1640 |
| 1C | 65/35 | 0.9387 | 0.16 | 3071 |
| 2A* | 70/30 | 0.9394 | 0.173 | 167 |
| 2B* | 70/30 | 0.9394 | 0.172 | 1015 |
| 2C | 70/30 | 0.9403 | 0.149 | 1950 |
| 3A* | 80/20 | 0.9416 | 0.113 | 107 |
| 3B* | 80/20 | 0.9429 | 0.123 | 311 |
| 3C | 80/20 | 0.9426 | 0.108 | 458 |

[1]as measured by ASTM D1505.
[2]as measured by ASTM D1238.
[3]as measured by ASTM D5397 (30% yield stress).

I claim:

1. A polymer blend which comprises:
   (a) from about 50 wt % to about 80 wt % of a high molecular weight, high density polyethylene that has a density greater than about 0.94 g/cc and an $MI_2$ less than about 0.1 dg/min; and
   (b) from about 20 wt % to about 50 wt % of a linear low density polyethylene that has a density within the range of about 0.90 to about 0.93 cc/g and an $MI_2$ within the range of about 0.5 to about 5 dg/min, wherein the linear low density polyethylene is a copolymer of ethylene with 1-hexene and the linear low density polyethylene has a dart drop impact strength of greater than about 500 grams as measured by ASTM D 1709/A.

2. The blend of claim 1 that has a density within the range of about 0.93 to about 0.945 g/cc.

3. The blend of claim 1 that has an $MI_2$ within the range of about 0.06 to about 0.4 dg/min.

4. The blend of claim 1 that has a density within the range of about 0.93 to about 0.945 g/cc and an MI2 within the range of about 0.06 to about 0.4 dg/min.

5. The blend of claim 1 wherein the linear low density polyethylene has a density within the range of about 0.91 to about 0.925 g/cc.

6. The blend of claim 1 wherein the linear low density polyethylene has a dart drop impact strength of greater than about 600 grams as measured by ASTM D1709/A.

7. The blend of claim 1 wherein the high molecular weight, high density polyethylene has a density greater than about 0.946 g/cc.

8. The blend of claim 1 wherein the high molecular weight, high density polyethylene has an $MI_2$ less than about 0.08 dg/min.

9. The blend of claim 1 wherein the blend has a notched constant tensile load of greater than about 1000 hours, as measured by ASTM D5397.

10. A polymer blend which comprises:
    (a) from about 60 wt % to about 75 wt % of a high molecular weight, high density polyethylene that has a density greater than about 0.94 g/cc and an $MI_2$ less than about 0.1 dg/min; and
    (b) from about 25 wt % to about 40 wt % of a linear low density polyethylene that has a density within the range of about 0.91 to about 0.925 cc/g and an $MI_2$ within the range of about 0.5 to about 5 dg/min, wherein the linear low density polyethylene is a copolymer of ethylene with 1-hexene and the linear low density polyethylene has a dart drop impact strength of greater than about 500 grams as measured by ASTM D1709/A.

11. The blend of claim 10 that has a density within the range of about 0.93 to about 0.945 g/cc.

12. The blend of claim 10 that has an $MI_2$ within the range of about 0.06 to about 0.4 dg/min.

13. The blend of claim 10 wherein the linear low density polyethylene has a dart drop impact strength of greater than about 600 grams as measured by ASTM D1709/A.

14. The blend of claim 10 wherein the high molecular weight, high density polyethylene has a density greater than about 0.946 g/cc.

15. The blend of claim 10 wherein the high molecular weight, high density polyethylene has an $MI_2$ less than about 0.08 dg/min.

16. The blend of claim 10 wherein the blend has a notched constant tensile load of greater than about 1000 hours, as measured by ASTM D5397.

17. A medium density pipe comprising the blend of claim 1.

18. A geomembrane comprising the blend of claim 1.

19. A medium density pipe comprising the blend of claim 10.

20. A geomembrane comprising the blend of claim 10.

* * * * *